E. M. NELSON.
TIRE CHAIN FASTENER.
APPLICATION FILED SEPT. 15, 1919.
1,341,924.
Patented June 1, 1920.
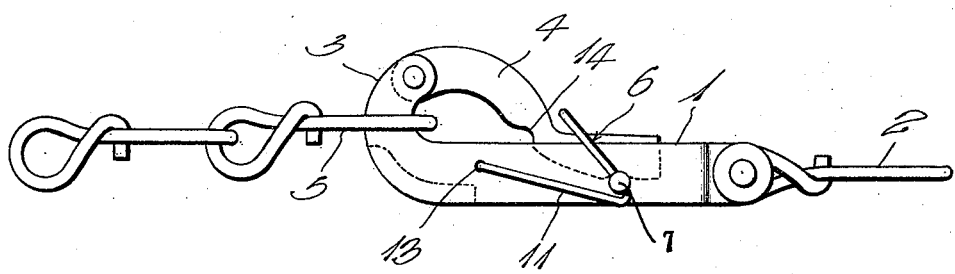
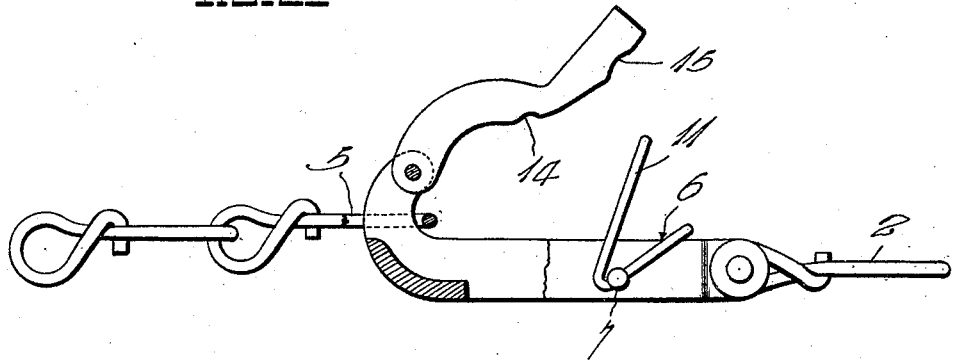
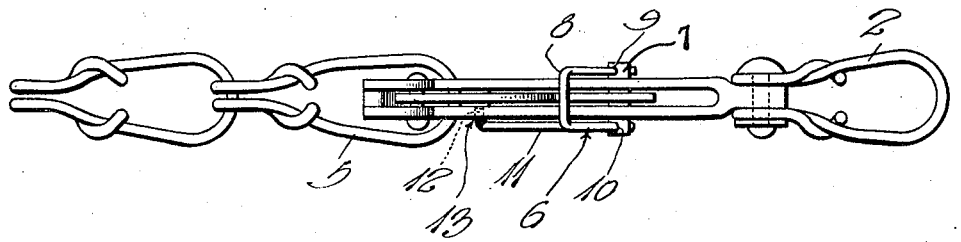
Inventor
E. M. Nelson
Witness
H. Woodard
By H. B. Willson &co
Attorneys

UNITED STATES PATENT OFFICE.

ELIJAH M. NELSON, OF VILLISCA, IOWA.

TIRE-CHAIN FASTENER.

1,341,924.  Specification of Letters Patent.  Patented June 1, 1920.

Application filed September 15, 1919. Serial No. 323,730.

*To all whom it may concern:*

Be it known that I, ELIJAH M. NELSON, a citizen of the United States, residing at Villisca, in the county of Montgomery and State of Iowa, have invented certain new and useful Improvements in Tire-Chain Fasteners; and I do declare the following to be a full, clear, and exact description of the invention, such as will enable others skilled in the art to which it appertains to make and use the same.

This invention relates to improvements in automobile tire chain fasteners such as are used to secure the ends of a tire chain together.

The primary object of the invention is to provide a fastener which is simple in construction, strong, durable, inexpensive and effective, one which may be easily and readily manipulated, and one which has means incorporated therewith to prevent accidental opening of the fastener, thus preventing loss of chains which is common with the type of fasteners now in use.

Another object of the invention is to provide a tire chain fastener which has a latch arm incorporated therewith, which is in effect a lever, and which can be used in drawing the chain around the tire when the chain is being put in position on the tire.

Other objects and advantages of the invention will be apparent during the course of the following description.

In the accompanying drawings forming a part of this specification and in which like numerals are employed to designate like parts throughout the same;

Figure 1 is a side elevational view of a device constructed in accordance with my invention.

Fig. 2 is a view similar to Fig. 1, partly in section, showing the latch arm in open position.

Fig. 3 is a top plan view thereof.

In the drawings, wherein for the purpose of illustration is shown a preferred embodiment of my invention, the numeral 1 designates a bifurcated hook shaped member to one end of which the end link 2 of the tire chain is permanently secured. Pivotally secured to the bill 3 of the hook member is a latch arm which is adapted to swing downward and into the space or bifurcation in the shank of the hook member 1 and prevent displacement of the other end link 5 from the bill 3.

In order to insure the latch arm against accidental opening and to prevent loss of the chains from the tire, I employ an angular latch retaining member 6. By preference this retaining member is mounted on a rock shaft 7 which extends through the shank of the hook member 1. The latch member is composed of a single piece of wire which is bent between its ends to form a substantially U-shaped loop 8 which, when in position, straddles the free end of the latch arm 4 and prevents accidental opening of the same. One end of the wire is extended or passed through a hole 9 adjacent one end of the rock shaft 7, and the other end thereof extends through a like hole 10 adjacent the other end of the rock shaft, and is then bent laterally from said rock shaft to provide a resilient arm 11. The extremity of the arm 11 is bent laterally to form a short finger 12 which enters or is adapted to engage in a perforation 13 in one side of the shank of the hook shaped member 1 and prevent rotation of the rock shaft 7, and thus retain the parts in locked position. With this construction it will be seen that when the latch arm is closed, the U-shaped loop 8 will straddle the free end thereof as shown in Fig. 3, and prevent the same from opening, thereby preventing the chain to which it is attached from becoming lost.

When it is desired to unlock the latch arm retaining member 6, it will be necessary only to disengage the finger 12 from the aperture 13 and swing the said member to the position shown in Fig. 2, which position will permit the latch arm 4 to then be opened.

As shown more clearly in Fig. 2 the latch arm is provided with seats or notches 14 and 15, the notch 15 serving to permit the end of the latch to rest or bear on the rock shaft 7, as indicated in dotted lines Fig. 1. The seat 14 is adapted to receive the link 5 therein when the latch arm is used as a lever. In other words, it is well known that in placing a chain on a tire it is not always easy to get the end links close enough together to permit the one end link to be fastened over the bill of the hook member, and a slight drawing action on the chain is oftentimes necessary. Hence, it is the purpose of the latch arm 4 to serve as a chain tightener. To this end the said latch arm will be opened wide enough to permit the end link 5 to engage in the notch 14, and the arm will then be pulled forward or in a direction to tighten the chain on the tire. When the parts assume a position, as shown in Fig. 2 the link 5 will automatically drop back and into the position shown in this figure and the chain will assume the usual "floating" on the tire.

It is to be noted that because of the open construction of the shank of the hook shaped member 1, mud and dirt may easily pass therethrough and will in no way obstruct the working of the latch arm 4. However, should the parts become rusty and stick, any suitable tool, such as a screw driver, may be inserted beneath the latch arm to open it.

It is to be understood that the form of my invention herein shown and described is to be taken as a preferred form of the same, and that various changes in the shape, size and arrangement of parts may be resorted to without departing from the spirit of the invention or the scope of the subjoined claims.

Having thus described my invention, what I claim is:—

1. In a tire chain fastener, a hook-shaped member having a recess adjacent one of its ends, a latch arm pivoted to the bill of the hook shaped member and adapted to swing in close relation to the shank of said member, a rock shaft extending through the shank of the hook shaped member, a latch arm retaining member mounted on said rock shaft and adapted to straddle the latch arm to retain the same in locking position, and a resilient arm extending laterally from said rock shaft, said resilient arm having its free end bent laterally to enter the recess in the hook shaped member to prevent rotation of the rock shaft.

2. In a tire chain fastener, a hook-shaped member having a perforation in one side thereof, a latch arm pivoted to the bill of said hook-shaped member and adapted to swing in close relation to the shank of the hook member, a rock shaft extending through and beyond the shank of the hook member, the extended portion thereof being provided with holes, a latch retaining member composed of a single piece of wire having one of its ends extending through the hole in one end of the rock shaft, a portion of said wire being bent between its ends to form a substantially U-shaped loop which is adapted to straddle the latch arm when the latter is in operative position, the opposite end of the wire being extended through the hole in the other end of the rock shaft and then bent laterally with respect to said rock shaft, the extremity of said wire being bent laterally to enter the perforation in the shank of the hook-shaped member, substantially as described and for the purposes set forth.

In testimony whereof I have hereunto set my hand.

ELIJAH M. NELSON.